A. W. J. MASON.
Improvement in Dryers.

No. 120,447. Patented Oct. 31, 1871.

Witnesses:
John Becker
Francis McArdle

Inventor:
A. W. J. Mason
per
Attorneys.

UNITED STATES PATENT OFFICE.

ALFRED W. J. MASON, OF NEW ORLEANS, LOUISIANA.

IMPROVEMENT IN DRIERS.

Specification forming part of Letters Patent No. 120,447, dated October 31, 1871.

*To all whom it may concern:*

Be it known that I, ALFRED W. J. MASON, of New Orleans, in the parish of Orleans and State of Louisiana, have invented a certain Improvement in Apparatus for Drying Cotton, Wool, &c.; and I do hereby declare the following to be a full, clear, and exact description thereof, which will enable those skilled in the art to make and use the same, reference being had to the accompanying drawing forming part of this specification.

My invention consists of separate heating or drying-chambers with two endless belts of wire-gauze or other open substance, through which the air can circulate freely, passing through said chambers to carry the substance to be dried between them; the said belts being arranged one above another to receive the said substances between them.

Streams of cold or heated air (or gases for bleaching) are forced into each chamber, which has its own separate discharge-pipe, so that the aqueous vapor expelled from the wet substances in the first chambers will not enter those through which they pass during the latter part of the operation. The air is delivered upon the belts from contrary directions to get the best effects, and graduated in temperature according to the nature of the case, and the belts are moved fast or slow, as required. The said improved apparatus is applicable for drying damp or wet cotton, wool, cloths, and other substances.

Figure 1:
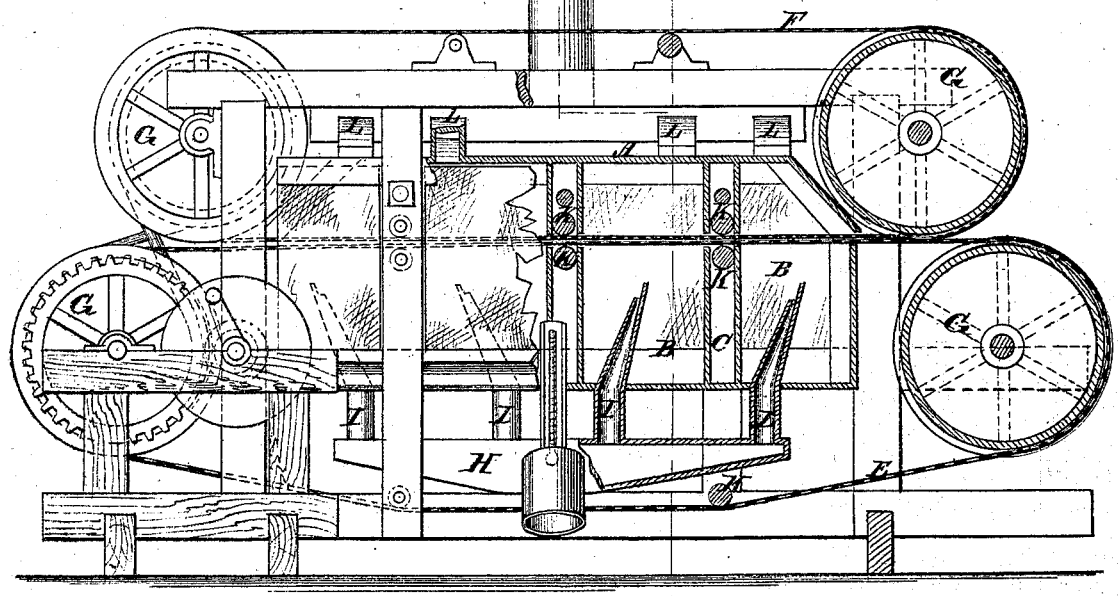
Figure 2:
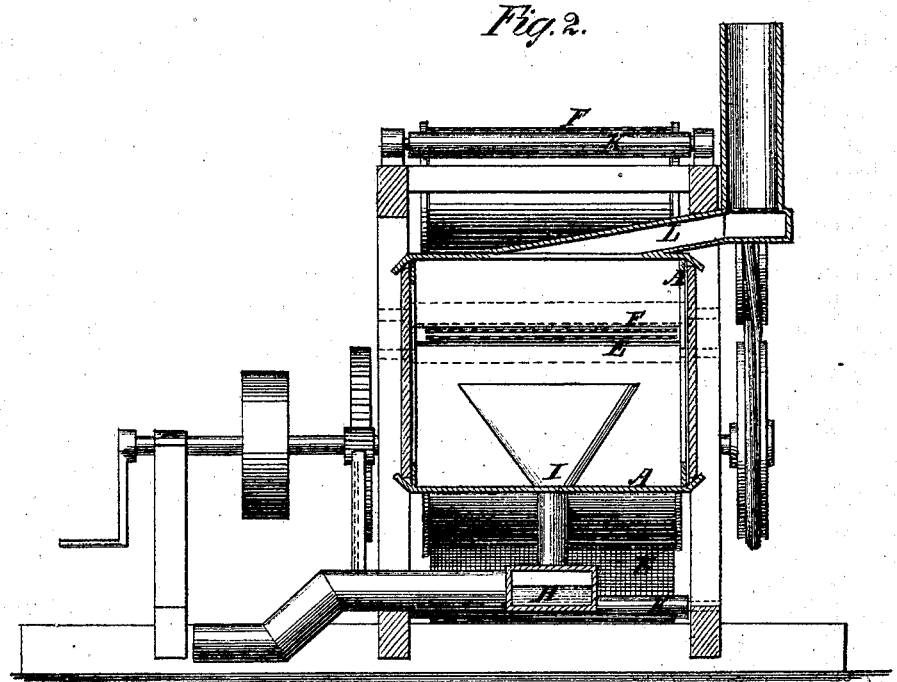

Figure 1 is a longitudinal sectional elevation of my improved machine, and Fig. 2 is a transverse sectional elevation of the same.

A represents a long drying-room, divided into compartments B by the double partitions C. E F represent the endless belts mounted on rollers G at each end of the house, one above another, so that one belt running below the upper rollers and the other one running above the lower rollers will run together in such manner as to confine any such substances as cotton, wool, cloth, and the like, spread on the lower belt before it arrives where the upper one comes down upon it, and hold them securely for carrying through the heated chambers and delivering at the other end. The said lower belt is purposely made longer than the other for so applying the goods to be dried, and to allow of taking them off after passing through. These belts are made of fine wire-gauze, or it may be any substance that the air will circulate through readily. H represents an air-holder under the dry-room for receiving the air from the blower and distributing it to the several compartments, for which it is provided with a conductor, I, for each, which preferably enters the compartments from the bottom, extends nearly up to the belts, and is flattened at the discharging ends in the transverse direction of the belts for delivering their blasts across them. Each chamber is provided with a discharge-spout, L, of its own to keep the damper air discharged from the first compartments, through which the substances, being dried, pass first from the others, where it would, to some extent, counteract the subsequent drying action by again coming in contact with the said substances, as they would if these partitions were not used. Guide-rollers K are placed in the partitions C; also in other places, in connection with the belts, to properly control them in passing through the drying-chambers.

Having thus described my invention, I claim as new and desire to secure by Letters Patent—

1. The combination, with the drying-case A arranged in separate compartments, of the endless carrying-belts, substantially as specified.

2. The separate compartments of the case A, each provided with a supply-conductor and an exhaust-spout, substantially as specified.

ALFRED W. J. MASON.

Witnesses:
A. P. FIELD,
JOHN DENNENY.

(48)